March 22, 1955     M. B. LEMESHKA     2,704,707
METHOD OF SALVAGING BRAZED ASSEMBLIES
Filed Feb. 18, 1954
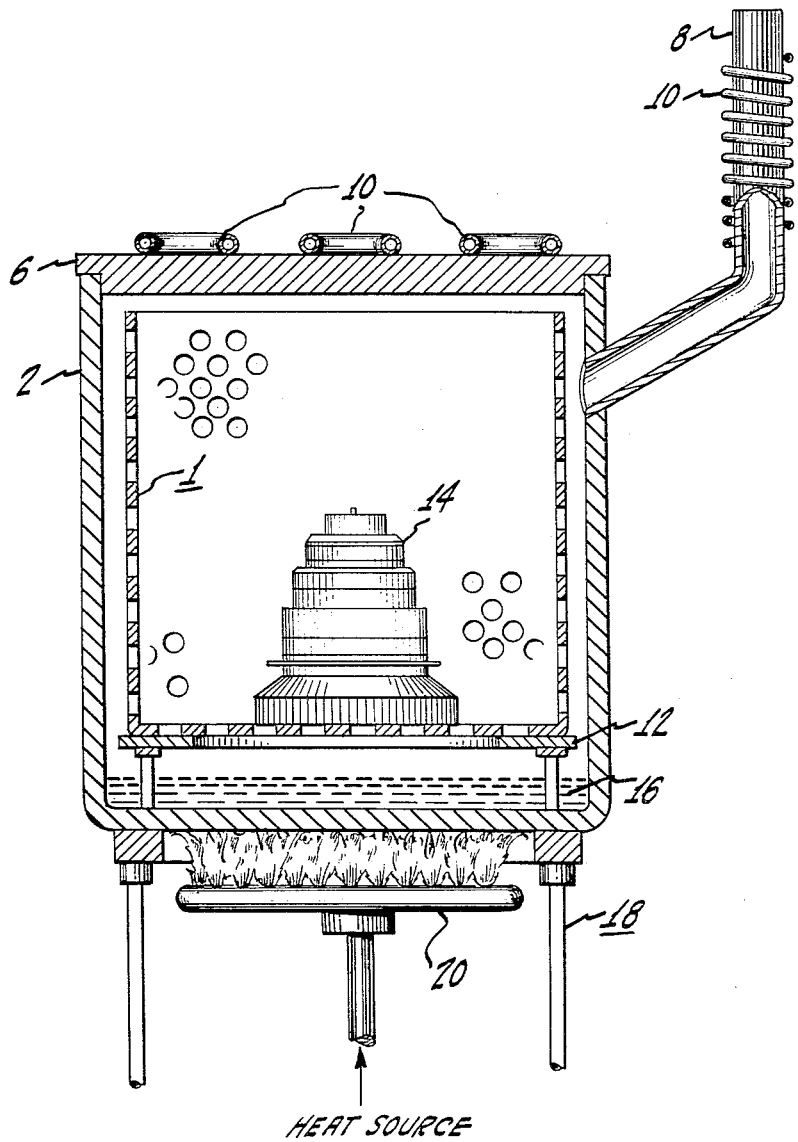
HEAT SOURCE
INVENTOR.
MILTON B. LEMESHKA
BY

United States Patent Office 2,704,707
Patented Mar. 22, 1955

2,704,707

METHOD OF SALVAGING BRAZED ASSEMBLIES

Milton B. Lemeshka, Lancaster, Pa., assignor to Radio Corporation of America, a corporation of Delaware Application February 18, 1954, Serial No. 411,213

6 Claims. (Cl. 75—0.5)

This invention relates to methods of salvaging brazed assemblies and more particularly to improved methods of separating brazed-together metal parts.

In certain industries a relatively large expense is incurred by the wasteful practice of discarding and scrapping entire brazed assemblies because certain parts only have been found defective. Many complete assemblies are also scrapped because of misalignment of their parts even when none of the parts is defective. In the electron tube industry the waste is especially high in the field of so-called power tubes. These are relatively large tubes and often include relatively substantial quantities of expensive metals such as nickel, tungsten, molybdenum, platinum and alloys thereof. Commonly as great a proportion as 20% of the gross production of power tube assembly line is scrapped because of defects discovered only after the tube assemblies are brazed. Sometimes the percentage of scrap for relatively intricate tubes may run as high as 80%.

It is apparent, therefore, that substantial savings may be accomplished in the production of electronic power tubes, and also in other industries that produce brazed assemblies, by utilizing a method of separating brazed-together parts so that only defective parts need be scrapped and misalignments may be corrected.

Accordingly, one object of the instant invention is to provide an improved method of separating the constituent parts of brazed assemblies.

Another object is to provide improved methods of salvaging parts of brazed assemblies without damaging them.

Another object is to provide improved salvage methods for brazed assemblies.

These and other objects are accomplished by the instant invention according to which brazed assemblies may be separated by immersion in heated mercury vapor. The mercury condenses on the parts and dissolves away the brazing compound, thus effectively destroying the bond. All the common brazing materials are relatively soluble in mercury. Materials such as silver, copper, gold, lead, tin, cadmium, aluminum and alloys of these metals are commonly used for brazing and are readily soluble in mercury. Nickel, iron, tungsten, molybdenum and alloys thereof are all commonly used as constituent parts of electronic power tube and other brazed assemblies. These metals are relatively insoluble in mercury and are not affected by the mercury vapor treatment of the instant invention.

The invention will be described in greater detail in connection with the accompanying drawing of which the single figure is a schematic, elevational, cross-sectional view of apparatus suitable for the practice of the invention.

According to one embodiment of the invention, brazed assemblies are placed in a steel basket 1 in a steel vessel 2 as shown in the drawing. The vessel is provided with a tight-fitting lid 6 and an upwardly extending vent pipe 8. The pipe may be of any convenient size. It is preferably relatively small in diameter and long in length, about 1" diameter and 4' long, for example, to insure complete condensation of the mercury vapor and to prevent the escape of the vapor into the atmosphere. The lid and vent pipe are provided with cooling means such as the pipe coils 10 through which cold water may be circulated. A perforated trivet or tray 12 is placed in the bottom of the vessel to support the basket which holds a brazed assembly such as the power tube 14 shown. The vessel may be of any convenient size large enough to hold the assemblies it is desired to salvage at any one time. For most power tube work a vessel about twenty inches in diameter and twenty inches deep is sufficient.

A quantity of mercury 16 is placed in the vessel. The amount of this quantity is not critical but for purposes of economy is preferably about one pound. The vessel is supported by any convenient means such as the tripod 18 and is heated by any known heat source such as the gas flames 20.

The mercury is boiled to produce mercury vapor which is condensed along the cover of the vessel and in the vent pipe. At the beginning of the operation mercury vapor also condenses directly on the brazed assembly. The condensed mercury falls back down over the assembly in a flushing stream which amalgamates and carries with it substantially all of the brazing alloy. The distillation is allowed to proceed for about one hour to insure complete amalgamation of all of the brazing compound of the assembly. The vessel and its contents are then allowed to cool to room temperature. The separated parts of the assembly may be removed and immersed in concentrated nitric acid for about ten minutes to dissolve mercury droplets that may remain on their surfaces. The parts are rinsed and dried and may be readily re-used without further treatment.

The mercury may be continued in use through several successive distillation operations. Even after it has picked up two or three times its own weight of brazing metals it may be redistilled to provide substantially pure mercury vapor in subsequent runs. It is preferred, however, periodically to separate the amalgamated brazing metal from the mercury. In this way values may be recovered in the form of brazing metal.

The practice of the invention is generally applicable to all brazed assemblies except those having exposed surfaces of mercury-soluble metals such as copper. Even such assemblies, however, may be salvaged according to the invention if their mercury-soluble surfaces are first coated with a mercury-insoluble metal before they are brazed. For example, the cost of nickel plating all of the mercury-soluble parts of a number of brazed assemblies may be substantially less than the value recovered by the salvage operation. This is especially true when the percentage of rejects is expected to be relatively high or when the brazed parts are relatively costly.

Certain metals such as some tempered steels may be damaged by heating even to the relatively moderate temperature of the boiling point of mercury (357° C.). Assemblies that include such metals may be salvaged according to the invention by distilling mercury over them at reduced pressures. For example, at 0.3 mm. of mercury pressure mercury boils at about 100° C. The vent pipe of the distilling apparatus may be connected to a vacuum pump to maintain the pressure within the vessel at any desired value to control the temperature of the operation. Substantially all the mercury vapor is condensed by cooling in the vent pipe and is not drawn off by the vacuum apparatus.

What is claimed is:

1. A method of salvaging brazed-together metal parts comprising immersing said parts in mercury vapor thereby to dissolve the brazing metals and to separate said parts one from another.

2. A method of disassembling brazed-together parts comprising enclosing said parts in a vessel together with a quantity of mercury and heating said mercury to at least its boiling point thereby to provide mercury vapor to surround and partially to condense on said parts to dissolve the brazing metal from between them and to separate them one from another.

3. The method according to claim 2 including venting said vessel, cooling said mercury vapor to condense it as it diffuses from said vessel and refluxing the condensate back into said vessel.

4. The method according to claim 2 in which the vapor pressure within said vessel is maintained below normal atmospheric pressure thereby to reduce the boiling point of said mercury.

5. A method of separating brazed-together parts comprising placing said parts in an atmosphere rich in mercury vapor and condensing said vapor to provide a flushing flow of mercury over said parts, thereby to dissolve the brazing metals and to separate said parts one from another.

6. The method according to claim 5 including the step of maintaining said atmosphere at a pressure below normal atmospheric pressure thereby to provide substantial quantities of said mercury vapor at a temperature below the normal boiling point of mercury.

References Cited in the file of this patent

UNITED STATES PATENTS

| | | |
|---|---|---|
| 1,562,202 | Boving | Nov. 17, 1925 |
| 1,989,852 | Eppensteiner | Feb. 5, 1935 |
| 2,212,270 | Kohler | Aug. 20, 1940 |